United States Patent [19]

Lawyer

[11] 4,048,612
[45] Sept. 13, 1977

[54] EXPLORATION SYSTEM FOR CROSS-STEERING AND STACKING SEISMIC DATA USING A SAWTOOTH TRAVERSE OF SHOT POINTS CENTRALLY SPACED BETWEEN AT LEAST A PAIR OF LINEAR DETECTOR SPREADS

[75] Inventor: Leon C. Lawyer, Walnut Creek, Calif.

[73] Assignee: Chevron Research Company, San Francisco, Calif.

[21] Appl. No.: 613,009

[22] Filed: Sept. 12, 1975

[51] Int. Cl.² ........................... G01V 1/16; G01V 1/20
[52] U.S. Cl. ................... 340/15.5 CP; 340/15.5 MC; 181/108
[58] Field of Search ....... 340/7 R, 15.5 CP, 15.5 MC; 181/108, 139

[56] References Cited

U.S. PATENT DOCUMENTS

| 3,529,282 | 9/1970 | Brown et al. | 340/15.5 CP |
| 3,597,727 | 8/1971 | Judson et al. | 340/15.5 MC |
| 3,691,529 | 9/1972 | Pizante | 340/15.5 MC |
| 3,806,863 | 4/1974 | Tilley et al. | 340/15.5 MC |
| 3,867,713 | 2/1975 | Tegland et al. | 340/7 R |
| 3,921,124 | 11/1975 | Payton | 340/15.5 CP |

Primary Examiner—Nelson Moskowitz
Attorney, Agent, or Firm—R. L. Freeland, Jr.; H. D. Messner

[57] ABSTRACT

In areal seismic exploration, seismic impulses are generated successively at locations spaced along a centrally located, asymmetic sawtooth shot-point line which regularly crosses a median line coincident with the line of survey. Seismic waves resulting from each impulse are detected at at least a pair of detector spreads each parallel to the median line, but offset from each other a distance equal to an integral multiple of the vertical offset of the shot-point line. Preferably the detected signals are summed on a cross-steered basis, such that the resulting traces associated with crossed sets of centerpoints normal to the survey line provide directional ("dip") information to better indicate areal subsurface structure. Additionally, the dectected signal can be stacked on a common depth point bases (CDPS).

12 Claims, 7 Drawing Figures

EXPLORATION SYSTEM FOR CROSS-STEERING AND STACKING SEISMIC DATA USING A SAWTOOTH TRAVERSE OF SHOT POINTS CENTRALLY SPACED BETWEEN AT LEAST A PAIR OF LINEAR DETECTOR SPREADS

BACKGROUND OF THE INVENTION

Field of the Invention

The present invention relates to the acquisition, processing and display of seismic information by means of at least two parallel spreads of seismic detectors flanking a centrally disposed sawtooth seismic source array. More particularly, the present invention relates to such a spread and detector array for the purpose of indicated areal subsurface structure underlying such spread and source array on either a cross-steered or stacked basis, or both.

PRIOR ART

Methods for collecting, processing and displaying cross-steered data have been disclosed in the following U.S. patents assigned to the assignee of the present invention, incorporated herein by reference: U.S. Pat. Nos.:

3,529,282, Brown et al., Sept. 15, 1970; 3,597,727, Judson et al., Aug. 3, 1971; 3,831,136, Sagochi, Aug. 20, 1974; 3,806,863, Tilley et al., Apr. 23, 1974.

It may be desirable in some applications to combine the aforementioned cross-steered field techniques with more conventional stacking techniques available in the art. While techniques have been disclosed which combine cross-steering and common depth point stacking methods, none of which I am aware utilize them in a manner that both (i) maximizes primary-to-multiple ratios of the combined traces, while (ii) minimizing cost of field collection, say by reducing the multiplicity of source points required to provide mimimum areal coverage of the subsurface area, at least up to a density of 4 centerpoints per square wavelength of the dominantly produced seismic signal.

OBJECT OF THE INVENTION

The object of the invention is the provision of an economical method for determining in-line and cross-dip data associated with areal subsurface structure, using seismic collection and processing techniques which result in cross-steerable and common depth point stacked (CDPS) data having both high primary-to-multiple and high-signal-to-noise ratios.

Other object features and advantages of the present invention will be made more apparent from the following detailed descriptions of preferred embodiments thereof, such descriptions to be taken in conjunction with the drawings.

SUMMARY OF THE INVENTION

In broad terms, the present invention discloses a method for aiding in the determination of the three-dimensional configuration of subsurface structure of an earth formation, and, moreover, illustrates a field procedure for obtaining locational traces capable of being associated with a two-dimensional grid of centerpoints which can be associated with a reference horizon overlying the three-dimensional subsurface structure of interest. The location of each centerpoint is midway between an individual source-seismic detector pair which, in turn, is associated with a particular locational trace generated by the field array of the present invention. Hence, the true field location, in a geometrical sense, of each element of the source-detector array, is critical to carrying out systematic collection of seismic data. In this regard, it has been found that the geometry of the array related both to the absolute and relative position of the seismic sources as well as that of the seismic detector spread must have the following characteristics and features:

1. The resulting locational traces must be capable of being associated with cross-lines of centerpoints substantially perpendicular to the line of survey as well as capable, simultaneously, of being associated with common centerpoints stacked on a common depth point basis;

2. Locational traces associated with cross-lines of centerpoints as well as associated with common depth points must be produced by individual source-point seismic detector pairs with each being provided with a rather large horizontal incremental spacing factor, say at least equal to 3000 feet;

3. Maximum total horizontal offset spacing of individual cross-aligned locational traces must be sufficient that combined sets of such traces produce statistically reliable directional traces as well as statistically reliable common depth point stacked traces after the former have been grouped and processed in accordance with the teachings of the present invention;

4. The locational traces must be produced by a minimum of shot points so as to provide an economical field collection process, but without loss in centerpoint areal coverage required to define subsurface with reasonable accuracy;

5. The field spread must include at least two parallel sets of linear detector spread lines centrally disposed about an asymmetric sawtooth array of source points, the latter regularly crossing a median line coincident with the line of survey of the field system.

Each centerpoint can be said to be representative of a reflection point of a subsurface stratum. If the stratum of interest, hypothetically speaking, is a horizontal flat horizon and the energy is assumed to travel along straight-line ray paths, the reflection point lies directly below an associated centerpoint. Each centerpoint also can be thought of and referred to with reference to a particular locational trace. Centerpoints associated with these locational traces are constructed as follows: a series of imaginary lines is drawn between each source point and each seismic detector station. The centerpoint of each line is midway along each imaginary line. Furthermore, since each centerpoint relates to a particular source-point seismic detector pair, each locational trace can be thought of and referred to as having a particular source-point-to-seismic-detector spacing. Suitable resolution of reflection wave events in the records, in direction and magnitude, can occur normally; the sources will be shot separately and individual locational records of the signals produced at each of the detector locations will be made so that there will be a separate locational trace for each station. For example, a first recording is made using the source at the apex of the sawtooth array of source points; then a second recording is made with the source advanced to the next position below the apex.

Each detector spread may either remain stationary during a predetermined sequence of shots, say six, or may be relocated after each shot to simulate conventional roll-along collection techniques. Assuming advance between adjacent cross-sets of source points is over the distance between adjacent detector stations, seismic locational traces thus will be produced in an economical and efficient fashion. The produced traces can be associated with a grid of subsurface reflection points of uniform density.

Each of the locational traces will undergo static and dynamic correction so as to produce traces which will be associated with individual center points of the two-dimensional grid of centerpoints. The total number of traces is equal to the product of the number of source points and the number of detector locations (or group locations if several detectors are used in each group).

Then the subgroups of corrected traces containing traces representing selected centerpoints will be processed by subgroups to produce a new subset of traces representing enhanced information existing in the original subgroup of traces. As a result, multiple reflected signals in the original locational traces will be suppressed relative to primary signals without affecting other subsets of traces representing information associated with other sets of traces.

Subgroups of traces grouped by their cross-centerpoint relationship to the in-line survey direction can be processed by a method process known as beam steering, producing directional traces having higher signal-to-noise as well as primary-to-multiple ratios than the original conventional traces. To produce each subset of directional traces with sufficiently high primary-to-multiple ratios, the incremental horizontal space factor, Dmax-Dmin, provided by the detection-source field array, can be at least 3000 feet where "Dmax is defined as maximum horizontal spacing between a source-detector pair producing one of the subgroups of processed traces and "Dmin" is the minimum horizontal spacing of another source-detector pair of the same subgroup of traces.

From these traces, indications of the moveout for an event can be obtained. Further, when a subgroup of directional traces from separate subsets of directional traces is considered collectively at a certain common, but maximum, cross-moveout for a primary signal event, the in-line moveout (perpendicular to cross-moveout) for the same event can be determined in a conventional manner, the differences being that the traces over which the differences in arrival times are determined represent wavelets recorded from a common azimuthal direction measured with respect to different in-line locations along a line coincident or at least parallel to the line of survey. In this way, the cross- and in-line dip of the subsurface can be reliably presented.

DETAILED DESCRIPTION OF PREFERRED EMBODIMENTS

Figure 1:
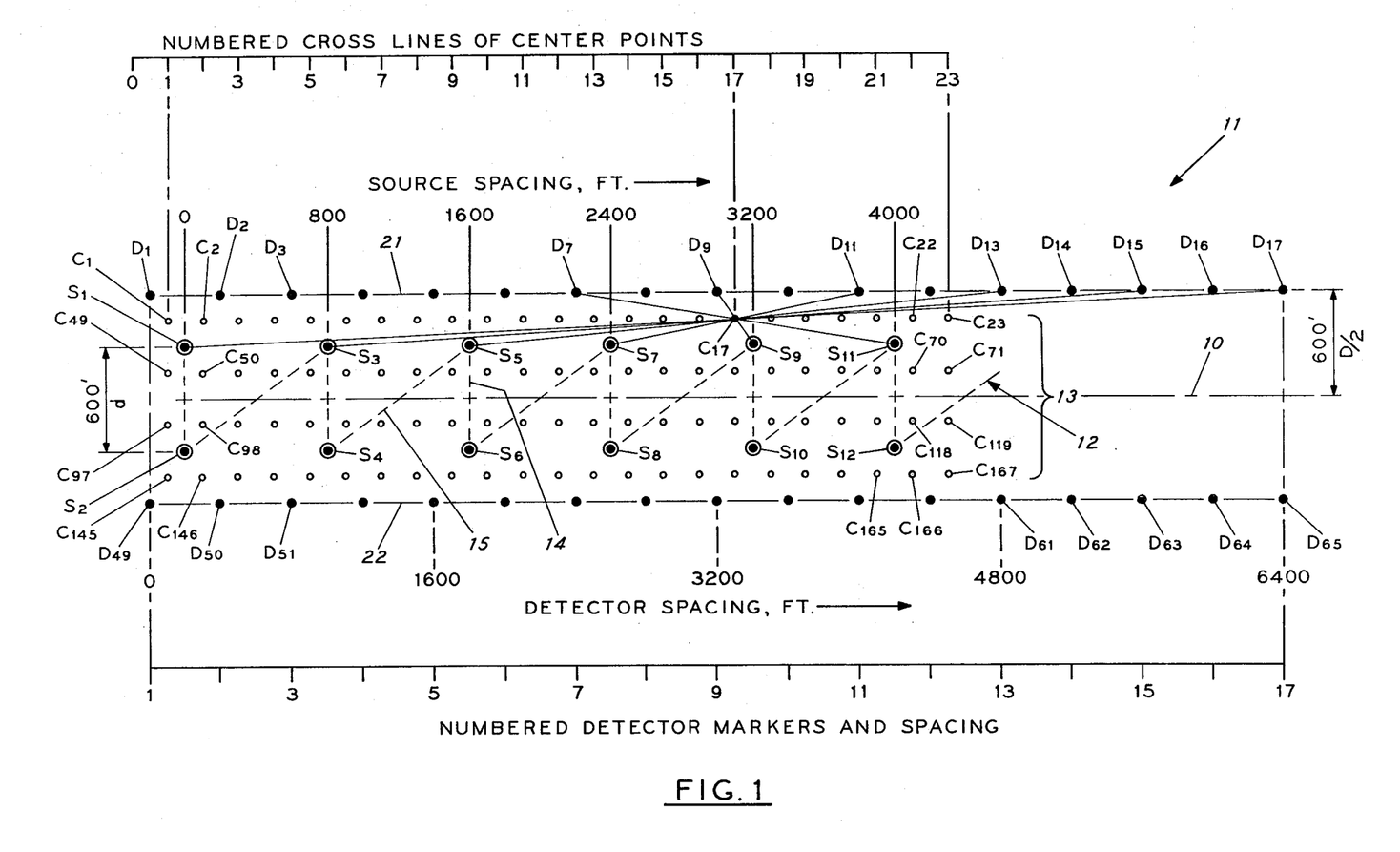
FIGS. 1, 2 and 3 each represent a plan view of a sawtooth field collection and processing technique in accordance with the present invention.

A method for carrying out the field procedures of the present invention is illustrated in FIG. 1, wherein line 10 represents a survey line or median line for operations of field array 11 of the present invention. For the purpose of the following description, it should be understood that the seismic field operation proceeds on a continuous basis about line 10. For illustrative purposes, source points $S_1$, $S_2$, $S_3$, $S_4$ . . . $S_{12}$ periodically cross survey line 10 and are laid out and define an asymmetric sawtooth pattern line 12. Note that alternative pairs of the source points form the leading edge (i.e., the "stepped" segment) of pattern line 12, viz., $S_1$, $S_2$; $S_3$, $S_4$; $S_5$, $S_6$; . . . $S_{11}$, $S_{12}$. Seismic sources located along pattern line 12 are sequentially energized beginning with source point $S_1$, then point $S_2$, and then left to right: at each point an impulse of seismic energy will be generated. The resultant reflected portion of the wave will be detected by seismic detectors comprising detector spreads 21 and 22 offset from survey line 10. As previously indicated,, at each detector station $D_1$, $D_2$. . . $D_{65}$ can be associated with a plurality of centerpoints $C_1$, $C_2$ . . . $C_{167}$ forming grid 13 of centerpoints symmetrically positioned around line 10. In general, each locational trace identifies a portion of energy reflecting from a hypothetical depth point assumed to be, for preliminary analytical purposes, located directly below a centerpoint; hence each centerpoint, as mentioned before, can be referred to as being associated with a particular depth point.

It should also be noted in FIG. 1 in this regard that centerpoints $C_1$, $C_2$, $C_3$. . . $C_{167}$ are at midpoint positions between respective source-point detector pairs forming field array 11. Through symmetrical positioning of the array, note that columns of centerpoints are positioned along lines normal to line 10 to form cross-sets of centerpoints identified with cross-lines $CL_1$, $CL_2$. . . $CL_{23}$ in FIG. 1, while other groups of centerpoints are aligned in four sets of in-line rows of centerpoints parallel to line 10.

Centerpoints $C_1$, $C_2$. . . $C_{167}$ of FIG. 1 associated with these locational traces also mark intersections of sets of vertical and horizontal grid lines of grid 13 as previously indicated, and determine the density of centerpoint grid 13. Where centerpoint density is uniform, the geometric spacing of centerpoints $C_1$, $C_2$. . . $C_{167}$ in the in-line direction must be a constant value.

As previously mentioned, seismic sources positioned at source points $S_1$, $S_2$. . . $S_{12}$ are sequentially energized to generate separate omnidirectional, three-dimensional waves of seismic energy which propagate ,from the individual source points down through the earth. As variations in acoustical impedance are encountered, portions of the energy are reflected back toward the earth's surface. The seismic detectors at selected detector stations $D_1$, $D_2$ . . . $D_{65}$ convert the mechanical movement of the earth as produced by the reflected waves to electrical signals which are recorded in a suitable form as locational traces.

Figure 7:
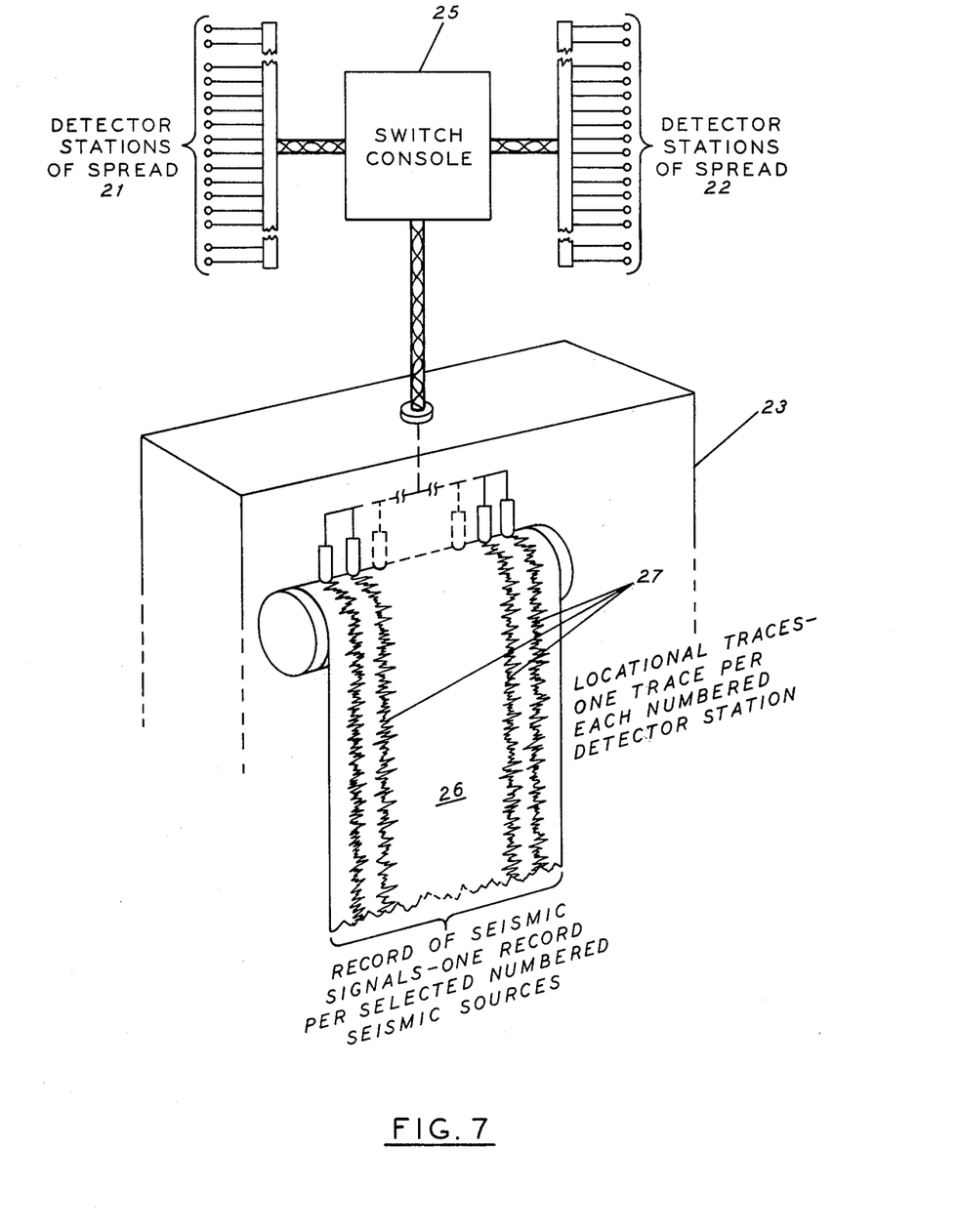
FIG. 7 is a schematic diagram of recording equipment useful in obtaining locational traces by the techniques of the present invention.

Recording and processing of the electrical signals at the stations $D_1$, $D_2$. . . $D_{65}$ of FIG. 1 can be made by a processor unit located in a field truck or at a distant laboratory. If the processor is field-operational, it can incorporate a microprocessor such as an Intel 8080 in combination with a memory, I/O's, supply and control circuitry for processing of the data in the manner set forth in more detail in FIG. 7. Note in FIG. 7 that processor 23 is connected to the outputs of the seismic detectors, say through switching console 25. The result is field record 26 identified by both the seismic source expending the energy, namely, the source at each source point, and the detector station $D_1, D_2 \ldots D_{65}$ receiving the reflected energy. For the embodiment illustrated in FIG. 1, locational traces are associated with centerpoints $C_1, C_2 \ldots C_{167}$ as well as being identified with sets of cross-lines $CL_1, CL_2 \ldots CL_{23}$. I.e., each individual locational trace 27 of record 26 is associated with a seismic source as well as a detector station.

Efficiency of the field procedure of the present invention is enhanced by the fact that individual detectors are positioned as pairs of detector spreads 21 and 22. Each an array decreases the total number of shot points which would be required in usual, conventional three-dimensional field processes. After locational traces have been produced using seismic wave impulses from source points $S_1$, the seismic detectors comprising spreads 21 and 22 are moved from left to right, as with one station interval, to new locations and the process repeated. In FIG. 1, it is assumed that each spread 21, 22 comprises the usual number of detectors, viz, an array of 48 detectors per spread. Hence each detector could be advanced one station, whereby the 48th detector of spread 21 and the 97th detector of spread 22 assumes new station locations; the remaining detectors occupy positions previously associated with their neighboring detectors. As locational traces are produced at these new positions, field efficiency is enhanced.

Returning again to FIG. 1 along the bottom of the figure, note that the individual pairs of vertically aligned detectors comprising spreads 21 and 22 have a common in-line spacing interval of about 400 feet. Along the sides of the plot, the offset spacing of the source points and detector splits are also indicated as being equal to about 600 feet and 1200 feet, respectively. Along the top of the figure, note also the positions of the cross-lines $CL_1, CL_2 \ldots CL_{23}$ are aligned with associated cross-sets of centerpoints, each set being normal to survey line 10. As indicated, the in-line component as well as the offset component spacings are constant incremental values. In-line spacing between detector stations is seen to be about 400 feet, while the source point in-line spacing is 800 feet. The height of each vertical step 14 of asymmetrical sawtooth line 12 is equal to the spacing of the source points, i.e., 600 feet, while the angle between angular segments 15 of sawtooth line 12 and a horizontal line parallel to the line of survey 10 is approximately 37°.

Spacing between adjacent detector stations $D_1, D_2 \ldots D_{65}$ and source points $S_1 \ldots S_{12}$, of course, determines geometrical position for each locational trace. It should also be noted that more than one locational trace can be associated with the same centerpoint. E.g., for collection array 11 depicted in FIG. 1, each centerpoint $C_1, C_2 \ldots C_{167}$ can be associated with 6 separate location traces. And each provided locational trace (whether associated with a cross-set or common number of centerpoints) can be delineated, in accordance with the teachings of this invention, to relate horizontal spacing of each locational trace to actual spacing of source-detector array 11 used in the field.

Figure 4:
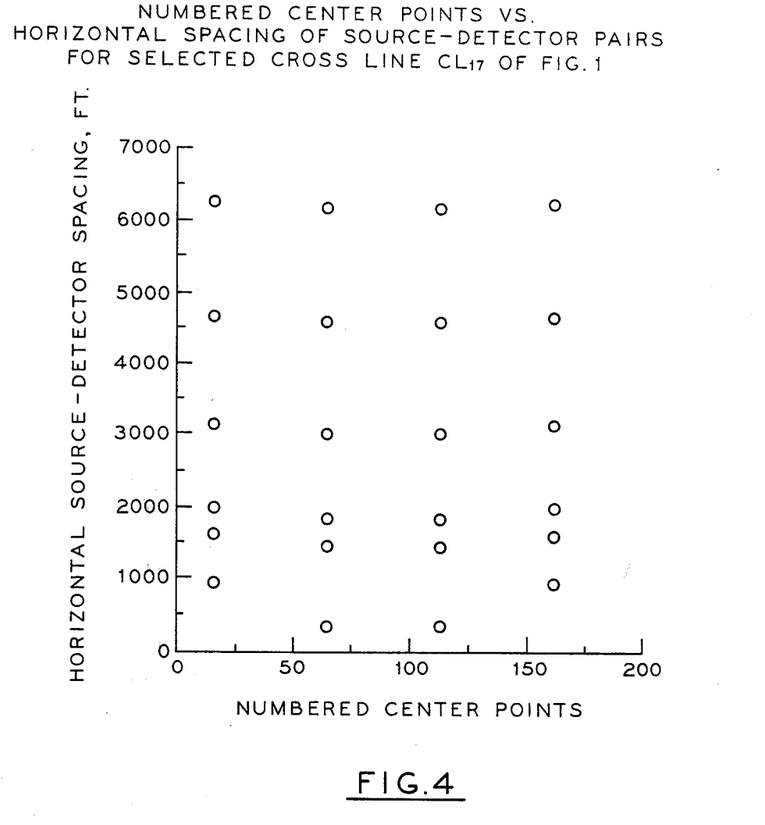
FIGS. 4, 5 and 6 each illustrate a plot of variation in source-to-detector horizontal spacing for a selected plurality of cross-center points associated with each array depicted in FIGS. 1, 2 and 3, respectively.

FIG. 4 sets forth specific horizontal seismic detector-to-source spacing data of traces associated with centerpoints comprising a selected number of cross-centerpoints of grid 13 of FIG. 1.

In more detail in FIG. 4, the horizontal scale represents centerpoints associated with the cross-set of traces identified with $CL_{17}$ of FIG. 1, viz, centerpoints $C_7, C_{65}, C_{113}$ and $C_{165}$. Note that each such centerpoint is associated with 6 separate locational traces. E.g., collection array 11 of FIG. 1 provides common traces at $C_{17}$ associated with the following source-detector pairs: $S_1$-$D_{17}$; $S_3$-$D_{15}$; $S_5$-$D_{13}$; $S_7$-$D_{11}$; $S_9$-$D_9$; and $S_{11}$-$D_7$. It is to be noted that the locational traces when summed provide a maximum incremental spacing factor equal to Dmax-Dmin where Dmax and Dmin are the maximum and minimum spacing of the individual source-point-detector pairs associated with a given centerpoint. For the traces associated with centerpoints $C_{17}, C_{65}$ and $C_{161}$ in FIG. 4 using the array of FIG. 1, the maximum spacing factor associated with these centerpoints is equal to 5850 feet, 5350, feet, 5350 feet and 5850 feet, respectively.

It is apparent that the geometrical distribution of the common centerpoints of grid 13 of FIG. 1 should preferably be symmetrical about survey line 10. Where regularity in two dimensions is an important factor (considering the ultimate uses to which the data are to be placed), it may be desirable to utilize collection array 30 of FIG. 2. As indicated, array 30 is seen to provide extended offset coverage as well as to provide complete uniformity in both in-line and cross-direction.

Figure 2:
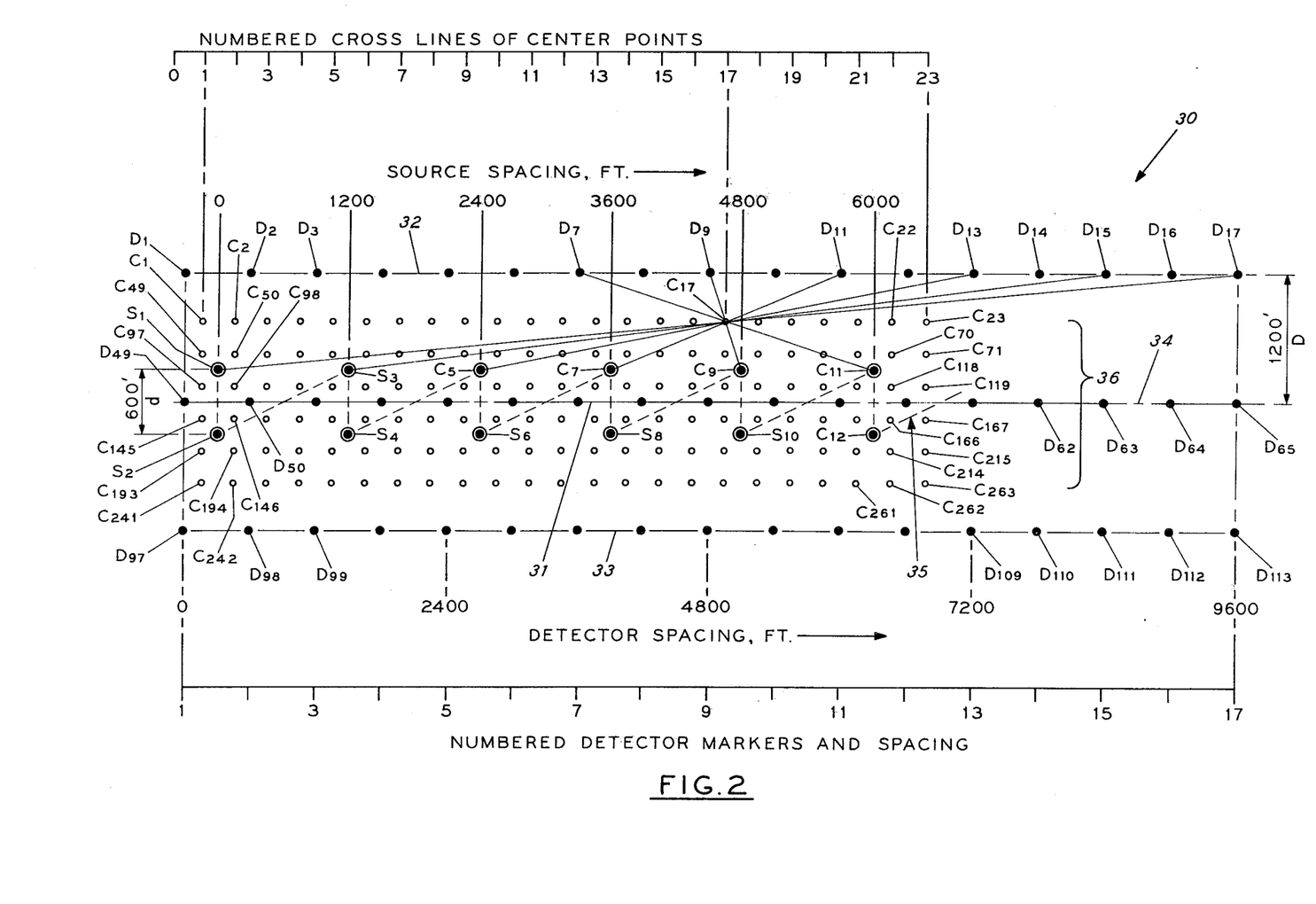

As shown in FIG. 2, the pattern of coverage is extended by the addition of central spread 31 midway between offset detector spreads 32 and 33 coincident with survey line 34. With such an array, the subsurface set of reflection depth points can be identified with a corresponding array of centerpoints $C_1, C_2 \ldots C_{263}$ where each centerpoint is associated with a particular source-point detector pair. As shown in FIG. 2, the pairs of detector spreads 32 and 33 offset to each side of survey line or median line 34, and central detector spread 31, coincident with survey line 34, are used on a continuous basis to detect reflections of energy as sources at shot points $S_1 \ldots S_{12}$ are sequentially energized along asymmetrical sawtooth line 35. The result: a series of locational traces which can be identified with the array of centerpoints comprising grid 36.

In FIG. 2, note that the cross-spacing between adjacent spreads 31, 32, 33 is about 1200 feet, so that the total offset spacing of the detector is 2400 feet. In-line spacing between adjacent detectors within each spread is about 600 feet. The cross-spacing between source points is approximately 600 feet; the in-line spacing is listed at the top of the figure. Cross-lines $CL_1, CL_2 \ldots CL_{23}$ indicate an in-line centerpoint spacing of about 300 feet. Similarly, for cross-centerpoint spacing, the distance is about 300 feet. Source-point spacing in the in-line direction, as depicted across the top of the figure, is 1200 feet. Cross-spacing is about 600 feet.

When a seismic source is located at source points $S_1, S_2 \ldots S_{12}$, a series of seismic waves is generated in sequence; as a result, a series of location traces associated with each respective centerpoint $C_1, C_2 \ldots C_{263}$ of grid 36 is generated. This assumes each spread is conventional, say composed of 48 detectors. However, the resulting seismic waves are both detected by offset spreads 32 and 33, as well as at central detector spread 31. Comparing grid 36 with that generated in FIG. 1, note that each cross-set of centerpoints associated with cross-lines $CL_1 \ldots CL_{23}$ is seen to be increased from four centerpoints per cross-line to six centerpoints per cross-line. However, as in the prior embodiment, each separate centerpoint of the above-mentioned cross-set of centerpoints is still associated with 6 separate locational traces. Consequently, by summing of these traces, suppression of multiples, as previously indicated, can be accomplished. Of course, horizontal spacing between detector stations $D_1, D_2 \ldots D_{112}$ of FIG. 2 is relevant to both suppression of multiples and the centerpoint geometric location for associated traces after processing has occurred.

Figure 5:
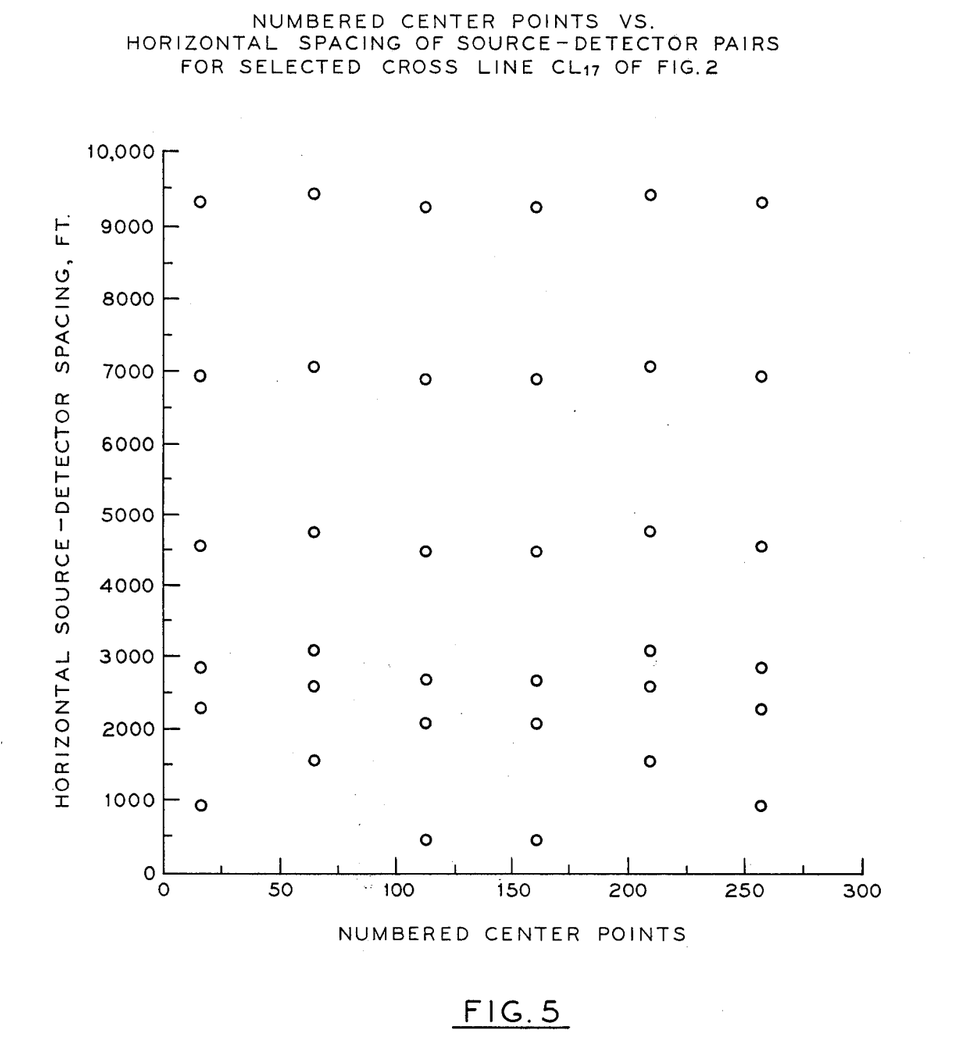

FIG. 5 illustrates a plot of horizontal spacings of traces associated with centerpoints comprising a selected number of cross-centerpoints of grid 36 of FIG. 2. In more detail, the horizontal scale represents the following centerpoints associated with cross-line $CL_{17}$ of FIG. 2: $C_{17}, C_{65}, C_{113}, C_{161}, C_{209}, C_{257}$.

Note that the vertical scale is in feet, which represents the horizontal detector-source pair spacings associated with traces identified with the listed individual centerpoints. It is evident that these traces, when processed, as by summation, provide summed traces which have high primary-to-multiple ratios. The maximum incremental spacing factor for the array, Dmax-Dmin, where Dmax is the maximum spacing of a subgroup of traces all associated with the same centerpoint, while Dmin is the minimum spacing of the same subgroup associated with these centerpoints of interest, is seen to be equal to 8400 feet for centerpoint $C_{17}$; 7775 feet for centerpoint $C_{65}$; 8875 feet for $C_{113}$; 8875 feet for $C_{161}$; 7775 feet for $C_{205}$; and 8400 feet for $C_{257}$. It will be appreciated that the traces, after correction, can be processed, say by stacking and then by beam-stearing of the stacked traces, to add interpretative quality of the final traces.

Figure 3:
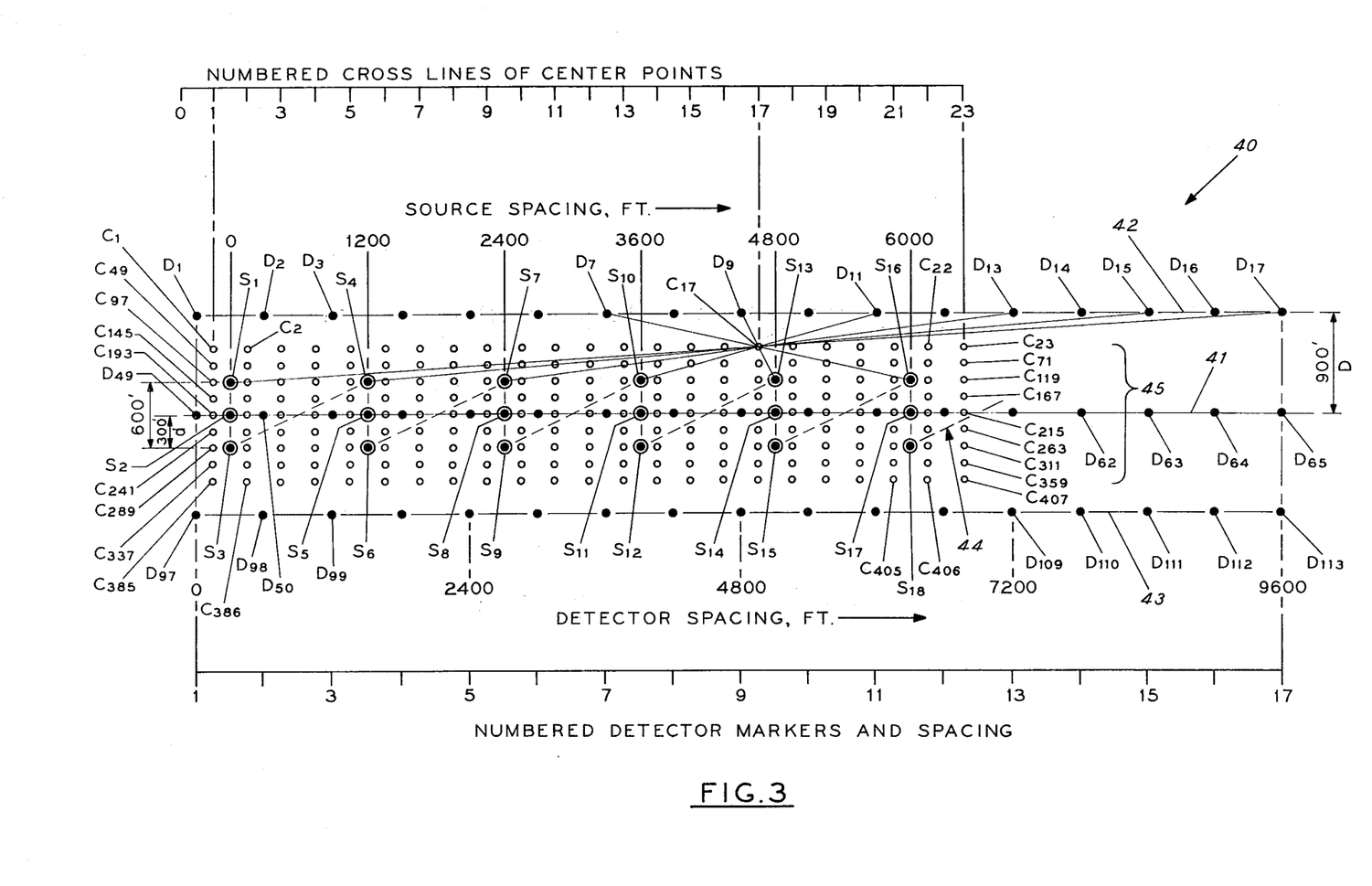

FIG. 3 illustrates yet another embodiment of the present invention.

Briefly, as indicated, array 40 provides locational traces in which associated cross-sets of centerpoints $CL_1, CL_2 \ldots Cl_{23}$ have been increased in number. As shown, the additional offset coverage (and density) has been generated by provision in array 40 of a series of shot points $S_2, S_5, S_8, S_{11}, S_{14}$ and $S_{17}$ positioned in coincident alignment with central spread 41. Note that spreads 42 and 43 remain at locations offset to central spread 41 to receive reflected energy from sources sequentially positioned at source points $S_1, S_2 \ldots S_{18}$ defining asymmetrical sawtooth pattern line 44.

It is understood that the seismic field operation proceeds on a continuous basis, as hereinbefore described; a source, in sequence, positioned at source points $S_1, S_2 \ldots S_{18}$, generates a seismic wave. The resulting wave is detected by detectors located at detector stations $D_1, D_2 \ldots D_{113}$. As a result, a series of location traces associated with centerpoints $C_1, C_2 \ldots C_{407}$ of grid 45 can be generated. It is apparent from the figure that each cross-set of centerpoints identified by cross-lines $CL_1, CL_2 \ldots CL_{23}$ now contains nine centerpoints (instead of six, as depicted in FIG. 2).

Figure 6:
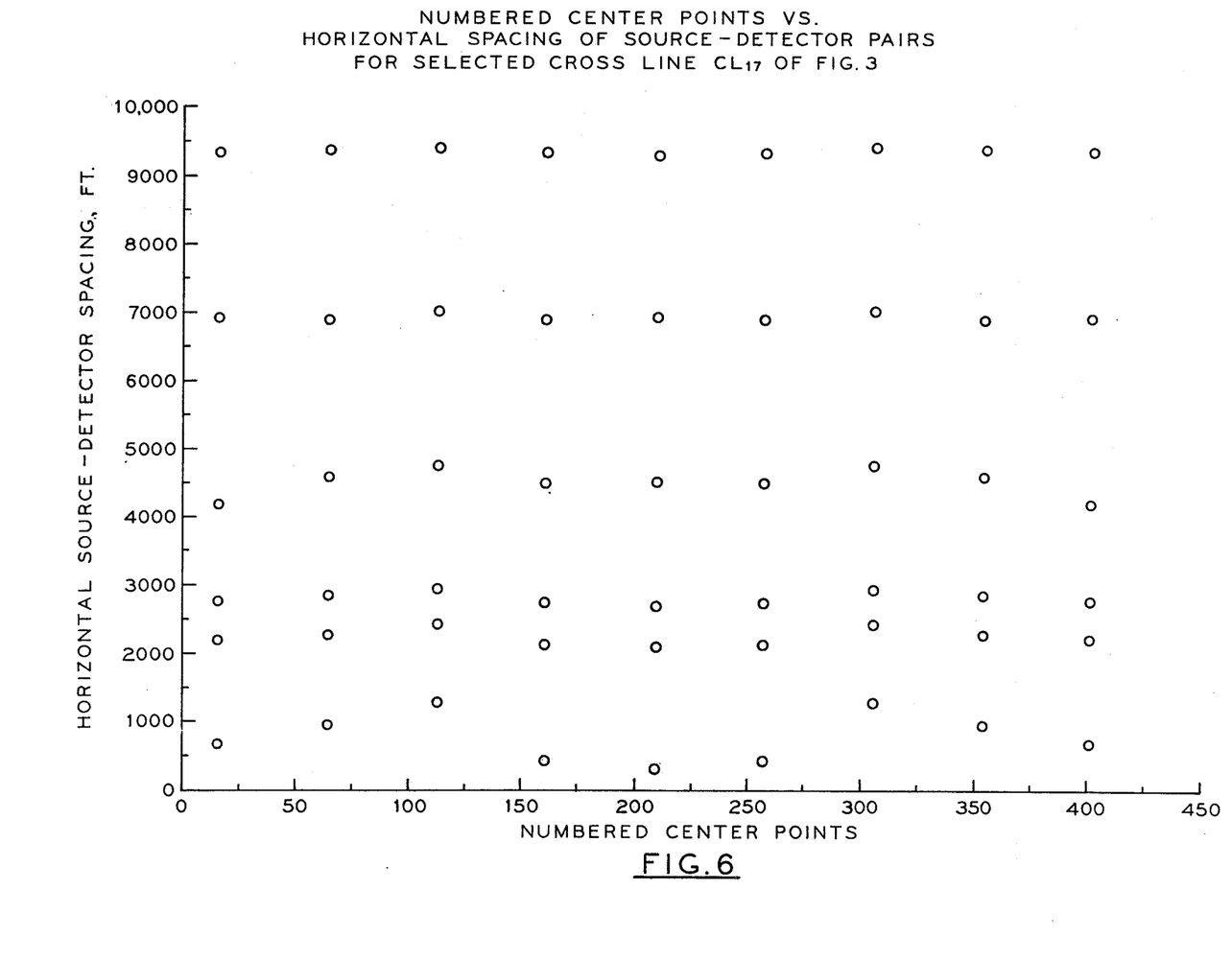

FIG. 6 illustrates a plot of horizontal spacing data of centerpoints comprising a selected number of cross-centerpoints of grid 45 of FIG. 3.

In more detail, the abscissa represents centerpoints associated with cross-line $CL_{17}$, viz, centerpoints $C_{17}, C_{65}, C_{113}, C_{161}, C_{209}, C_{257}, C_{305}, C_{353}$ and $C_{401}$. Again, for determination of individual spacing values, most direct ray path between an individual source point-detector pair has been chosen, say a vertical project through each pair at a common horizontal datum plane.

Note that the ordinate is in feet, which represents the horizontal detector-source point spacing associated with traces identified with the listed centerpoints. It is evident that these traces, when summed, provide high primary-to-multiple ratios. The maximum incremental spacing factor, Dmax-Dmin where the Dmax and Dmin are as previously defined, is seen to be equal to:

i. 8650 feet for centerpoints $C_{17}$; (ii) 8400 feet for centerpoint $C_{65}$; (iii) 8125 feet for centerpoint $C_{113}$; (iv) 8900 feet for $C_{161}$; (v) 9000 feet for $C_{209}$; (vi) 8900 feet for $C_{257}$; (vii) 8125 feet for $C_{305}$; (viii) 8400 feet for $C_{353}$; and (ix) 8650 feet for $C_{401}$. It will be appreciated that the traces provided by the array of the present invention, after correction, can be processed, say by stacking and then by beam-steering techniques, to add interpretative quality to the final traces. I.e., not only do the final traces provide for suppression of multiples, but they also have increased directional content, so that cross-dips of events within the traces can be identified with greater precision and reliability.

In summary, it should now be apparent that the geometrical distribution provided by the collection and processing techniques of the present invention is such that the offset distance separating adjacent detector spreads is always a constant and, moreover, is equal to an integral and cardinal number of the common offset distance separating adjacent shot points. For example, in FIGS. 1-3, note that distance ($d$) is the distance separating adjacent shot points while spacing D is the distance separating adjacent detector spreads. For the arrays of FIGS. 1 and 2, it is seen that $D=2(d)$; while in the array shown in FIG. 3, $D=3(d)$. Consequently, it is apparent that the geometrical distribution of all centerpoints, between all source point-detector pairs, is directly related to the offset distances and spacing separating incrementally adjacent shot points and detector spreads, as mentioned above.

It should also be apparent that when the locational traces associated with a common centerpoint, after correction, are processed in accordance with the present invention, suppression of multiples, vis-a-vis the primary signals within the traces, occurs. Correction relates to both static and dynamic correction techniques in which moveout within the traces is corrected to take into account usual collection variations. The movement, of course, of a primary signal marking a seismic event is different than the multiple associated with the same event.

However, since the moveout of a multiple signal increases more rapidly then the primary signal due to the increase in average velocity with depth and seismic energy in the earth, a difference in horizontal source-detector pair spacing tends to cause suppression of the multiples in the summed traces.

Normal moveout and static corrections can be introduced into the traces by several methods well known in the seismic art; one manner of introducing normal moveout corrections is shown in U.S. Pat. No. 2,838,473 of O.A. Fredriksson for "Normal Moveout Correction with Common Drive for Recording Medium and Recorder and/or Reproducing Means," assigned to the assignee of the present invention. While an analog method is there illustrated, it is quite evident that more modern digital processing technique can be substituted to provide such corrections, if desired.

After normal moveout and static corrections have been introduced into the locational traces, it is convenient to think of all the hypothetical reflecting depth points represented at the locational traces being directly below respective centerpoints at the grids of FIGS. 1, 2 and 3. It becomes reasonable also to think of each trace as being as shot and recorded using a source-detector pair located at the same centerpoint. After the traces produced by different source-detector combinations have been processed to provide appropriate normal moveout and dynamic corrections, they will be considered as representing traces derived from reflection depth points directly below the centerpoints all residing in a common datum plane and are conveniently designated corrected centerpoint traces. Such corrected centerpoint traces represent reflection points as if their reflected energy had originated therefrom but has been detected at the same appropriate centerpoint. It should also be understood that where there are dipping subsurface beds that variations in the attenuation of seismic energy with depth will occur; and the depth point on the reflecting horizon may not be vertically aligned below the centerpoints of the grid. However, for working convenience in the preliminary steps of processing, the corrected traces are treated as though they were representative of reflection point locations immediately below the centerpoint grids of FIGS. 1, 2 and 3.

While certain preferred embodiments have been specifically disclosed, it should be understood that the invention is not limited thereto, as many variations will be readily apparent to those skilled in the art. For example, reciprocity in the positions of the detectors and sources is intended as an acceptable alternative in carrying out the present invention. Thus, the invention is to be given its broadest possible interpretation within the terms of the following claims.

What is claimed is:

1. A seismic exploration method where seismic impulses are generated successively, one pulse at each of a plurality of source point locations along an asymmetrical sawtooth shot point line, having a stepped segment defining an offset spacing distance ($d$), between adjacent source point locations, and where seismic waves resulting from each of said impulses are detected by at least two detector spreads each containing a plurality of detectors spaced at a series of in-line detector locations, adjacent spreads being offset from each other a distance D, which is related to said source point spacing distance ($d$) by a ratio of 2:1 or greater which comprises:
   i. statically and dynamically correcting detected seismic signals so as to produce a series of corrected traces, said series of corrected traces containing sets of common traces associated with common centerpoints of a two-dimensional grid of centerpoints formed between particular source point location and detector spread location pairs, and cross-sets of traces associated with cross-lines of centerpoints of said grid, at least one trace of each set of common centerpoint traces being a product of a source-detector pair having a substantially different horizontal spacing than at least one other source detector pair of other common traces associated with said same set of common centerpoint traces,
   ii. stacking said sets of common traces to produce stacked traces having improved primary-to-multiple ratios which improve the portrayal of multifold areal surface structural conditions, and
   iii. beam-steering said stacked traces to produce subsets of cross-directional traces having improved directional content and signal-to-noise ratios.

2. The method of claim 1 in which said grid of the centerpoints formed between selected source point-detector pairs includes a plurality of centerpoints of substantially uniform centerpoint density in at least one dimension.

3. The method of claim 1 in which said offset spacing distance ($d$), between adjacent source point locations and said offset distance D between adjacent detector spreads are related by a cardinal number.

4. The method of claim 1 in which said offset spacing distance ($d$), between adjacent source point locations, and said offset distance $D$, between adjacent detector spreads, are related in accordance with $D=2(d)$.

5. The method of claim 1 in which said offset spacing distance ($d$), between adjacent source point locations, and said offset distance $D$, between adjacent detector spreads, are related in accordance with $D=3(d)$.

6. The method of claim 1 in which said horizontal spacing between said one trace and at least one other trace of said sets of common traces defines an incremental spacing factor, Dmax-Dmin, and in which said incremental horizontal spacing factor is between 5000 feet up to and including 9000 feet, where Dmax is the maximum horizontal spacing between source-detector pairs associated with said common centerpoint traces and Dmin is the minimum horizontal spacing associated with said same common centerpoint traces but with another source-detector pair other than said first-mentioned source-detector pair.

7. A seismic exploration method where seismic impulses are generated successively, one pulse at each of a plurality of source point locations along a sawtooth asymmetrical shot point line, having a stepped segment defining an offset spacing distance ($d$), between adjacent source point locations, and where seismic waves resulting from each of said impulses are detected by at least two detector spreads each containing a plurality of detectors spaced at a series of in-line detector locations, adjacent spreads being offset from each other a distance D, which is related to said source point spacing distance ($d$) by a ratio of 2:1 or greater than one which comprises:
   i. statically and dynamically correcting detected seismic signals so as to produce a series of corrected traces, said series of corrected traces containing sets of common traces associated with common centerpoints of a two-dimensional grid of centerpoints formed between particular source point location and detector spread location pairs, and cross-sets of traces associated with cross-line of centerpoints of said grid, at least one trace of cross-set of traces being a product of a source-detector pair having a substantially different horizontal spacing than at least one other source-detector pair of other cross-traces associated with said same set of cross-traces;
   ii. stacking said sets of common traces to produce stacked traces which improve the portrayal of multifold areal surface structural conditions; and
   iii. beam-steering said stacked traces to produce subsets of cross-directional traces having improved directional content as well as primary-to-multiple ratios.

8. The method of claim 7 in which said grid of the centerpoints formed between selected source point-detector pairs includes a plurality of centerpoints of substantially uniform centerpoint density in at least one dimension.

9. A seismic exploration method where seismic impulses are generated successively, one pulse at each of a plurality of source point locations along at least two parallel lines offset from each other a distance D, and where seismic waves resulting from each of said impulses are detected by a plurality of detectors positioned along a sawtooth asymmetrical line, having a stepped segment defining an adjacent offset spacing distance ($d$), between adjacent offset detector locations, and where each distance D is related to said detector offset spacing distance ($d$) by a ratio of 2:1 or greater which comprises:

i. statically and dynamically correcting detected seismic signals so as to produce a series of corrected traces, said series of corrected traces containing sets of common traces associated with common centerpoints of a two-dimensional grid of centerpoints formed between particular source point location and detector spread location pairs and cross-sets of traces associated with cross-lines of centerpoints of said grid, at least one trace of each set of common traces being a product of a source-detector pair having a substantially different horizontal spacing than at least one other source-detector pair of other traces associated with said same set of common traces;

ii. stacking said sets of common traces to produce stacked traces having improved primary-to-multiple ratios which improve the portrayal of multifold areal surface structural conditions; and iii. beam-steering said stacked traces to produce subsets of cross-directional traces having improved directional content as well as signal-to-noise ratios.

10. The method of claim 9 in which said offset spacing distance ($d$), between adjacent detector locations and said offset distance D, between cross-source point lines are related by a cardinal number.

11. The method of claim 9 in which said offset spacing distance ($d$), between adjacent detector locations and said distance D, between adjacent source lines, are related in accordance with $D=2(d)$.

12. The method of claim 9 in which said offset spacing distance ($d$), between adjacent detector locations, and said offset distance $D$, between adjacent source lines, are related in accordance with $D=3(d)$.

* * * * *